United States Patent
Hung et al.

(10) Patent No.: US 7,713,349 B2
(45) Date of Patent: May 11, 2010

(54) COATINGS INCLUDING PIGMENTS COMPRISING SUBSTRATE PARTICLES WITH ULTRAFINE METAL OXIDE PARTICLES DEPOSITED THEREON

(75) Inventors: Cheng-Hung Hung, Wexford, PA (US); Noel R. Vanier, Wexford, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 12/017,619

(22) Filed: Jan. 22, 2008

(65) Prior Publication Data

US 2009/0183651 A1 Jul. 23, 2009

(51) Int. Cl.
*C04B 14/00* (2006.01)
*C09C 1/14* (2006.01)
*C09C 1/36* (2006.01)
*C09C 1/00* (2006.01)
*B32B 5/16* (2006.01)
*H02N 6/00* (2006.01)

(52) U.S. Cl. .............. 106/401; 106/436; 106/480; 106/482; 136/244; 977/773; 977/775; 977/963; 428/402

(58) Field of Classification Search .............. 106/401, 106/436, 480, 482; 428/402; 136/244; 977/773, 977/775, 963
See application file for complete search history.

(56) References Cited

U.S. PATENT DOCUMENTS

| 3,100,719 | A | * | 8/1963 | Dunn, Jr. et al. | 106/18.35 |
|---|---|---|---|---|---|
| 3,342,617 | A | * | 9/1967 | Jackson | 106/415 |
| 4,255,308 | A | * | 3/1981 | Brasen | 524/504 |
| 4,384,065 | A | * | 5/1983 | Wong | 427/256 |
| 5,846,310 | A | | 12/1998 | Noguchi | |
| 5,989,648 | A | | 11/1999 | Phillips | |
| 6,129,785 | A | * | 10/2000 | Schliesman et al. | 106/482 |
| 6,228,904 | B1 | | 5/2001 | Yadav et al. | |
| 6,652,967 | B2 | | 11/2003 | Yadav et al. | |
| 6,716,525 | B1 | | 4/2004 | Yadav et al. | |
| 6,830,822 | B2 | | 12/2004 | Yadav | |

(Continued)

FOREIGN PATENT DOCUMENTS

DE      4237355      5/1994
DE   102006044076      3/2008

OTHER PUBLICATIONS

Grant & Hackh's Chemical Dictionary, Fifth Edition, edited by Roger Grant and Claire Grant, 1987, p. 352.*

(Continued)

*Primary Examiner*—Anthony J Green
*Assistant Examiner*—Pegah Parvini
(74) *Attorney, Agent, or Firm*—Donald R. Palladino

(57) ABSTRACT

Coatings including pigments comprising substrate particles with ultrafine metal oxide particles deposited on the surfaces thereof and made by a plasma process are disclosed. The substrate particles may comprise an oxide such as $SiO_2$, $Al_2O_3$, $Bi_2O_3$ and the like. The ultrafine metal oxide particles may be partially oxidized such as $Cu_2O$, $Ti_3O_4$ and the like. The pigments may be used in coating compositions in which the substrate particles substantially match the refractive index of the coating composition base, and the ultrafine metal oxide particles provide the desired reflectance characteristics for the coating.

23 Claims, 5 Drawing Sheets

U.S. PATENT DOCUMENTS

| | | |
|---|---|---|
| 6,849,109 B2 | 2/2005 | Yadav et al. |
| 6,875,800 B2 | 4/2005 | Vanier et al. |
| 6,913,830 B2 | 7/2005 | Decker et al. |
| 2006/0047035 A1* | 3/2006 | Chang et al. ............... 524/261 |
| 2007/0015012 A1 | 1/2007 | Bujard |
| 2008/0056977 A1 | 3/2008 | Hung et al. |
| 2008/0148905 A1 | 6/2008 | Hung et al. |

OTHER PUBLICATIONS

U.S. Appl. No. 11/468,424, filed Aug. 30, 2006 by Cheng-Hung Hung et al., for Production of Ultrafine Boron Carbide Particles Utilizing Liquid Feed Materials.

U.S. Appl. No. 11/873,712, filed Oct. 17, 2007 by Noel R. Vanier et al., for Doped Ultrafine Metal Carbide Particles.

* cited by examiner

COATINGS INCLUDING PIGMENTS COMPRISING SUBSTRATE PARTICLES WITH ULTRAFINE METAL OXIDE PARTICLES DEPOSITED THEREON

FIELD OF THE INVENTION

The present invention relates to pigmented coatings, and more particularly relates to coatings including inorganic pigments comprising substrate particles with ultrafine metal oxide particles deposited on the surfaces of the substrate particles.

BACKGROUND INFORMATION

Many types of pigments are used for various coating applications. For example, inorganic pigments such as $TiO_2$, $Fe_2O_3$, $Al_2O_3$, MgO, CaO, ZnO, carbon black and aluminum silicate are often used in paints and other coatings. Such inorganic pigments typically have particle sizes ranging from about 0.5 to about 30 microns, and are made by processes such as flame processes, plasma processes, solution processes and sol-gel processes. For example, most commercial $TiO_2$ is made using $TiCl_4$ as a starting material. Pure $TiCl_4$ is reacted with oxygen in an exothermic reaction to form titanium dioxide and to liberate chlorine, which is recycled to the chlorination stage. The high temperature ensures that only the rutile crystal form is produced. After cooling, the gas stream passes through a separator to collect the pigment particles, which are treated to remove adsorbed chlorine from the pigment.

SUMMARY OF THE INVENTION

In certain respects, the present invention is directed to a coating composition comprising a base coating material, and a pigment dispersed in the base coating material, wherein the pigment comprises substrate particles and ultrafine metal oxide particles deposited on the substrate particles.

In other respects, the present invention is directed to a method of making a coating composition comprising mixing a pigment and a base coating material, wherein the pigment comprises substrate particles and ultrafine metal oxide particles deposited on the substrate particles.

In further respects, the present invention is directed to a pigment comprising substrate particles, and ultrafine partially oxidized metal oxide particles deposited on the substrate particles.

In other respects, the present invention is directed to a method of making a pigment comprising introducing a substrate particle precursor and an ultrafine metal oxide particle precursor into a plasma, heating the precursors by the plasma to form pigment particles comprising substrate particles with ultrafine partially oxidized metal oxide particles deposited thereon, and collecting the pigment particles.

DETAILED DESCRIPTION

Figure 1:
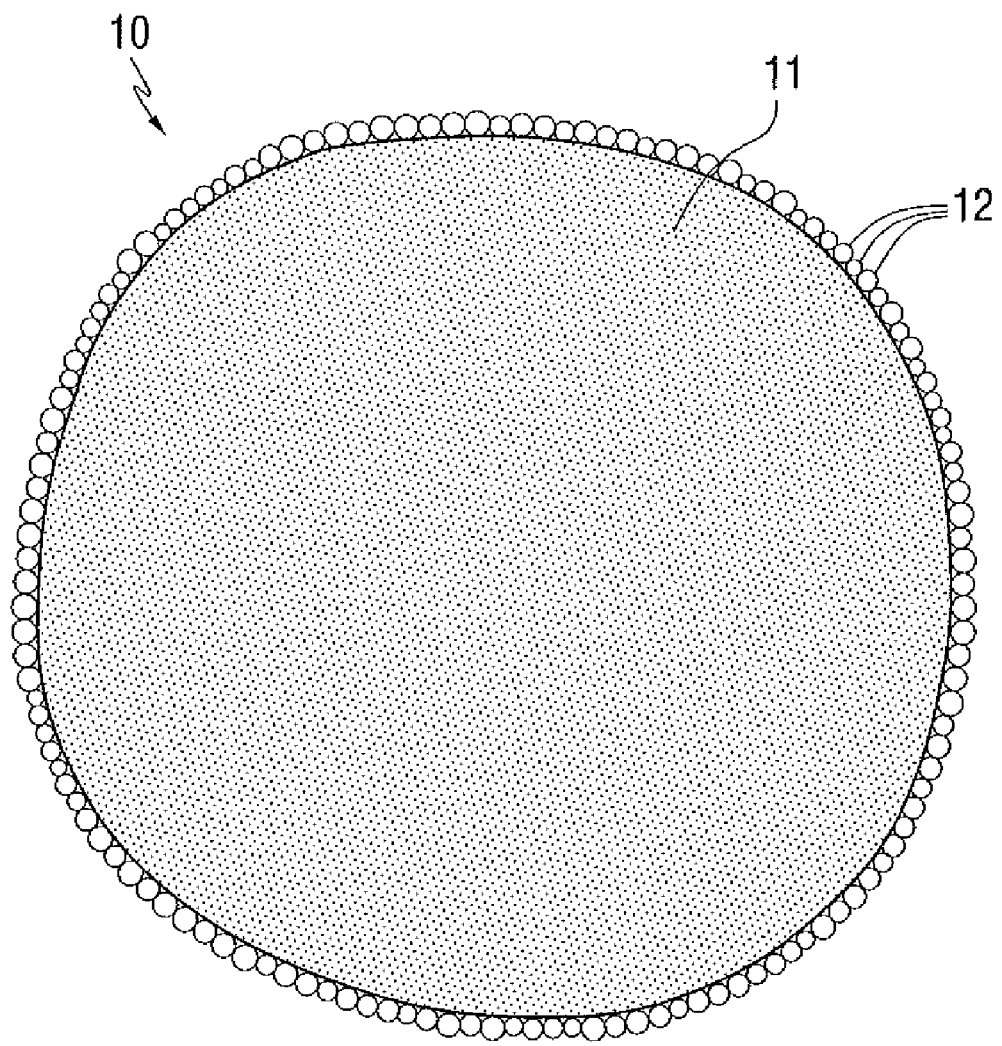
FIG. 1 illustrates a pigment particle comprising a substrate particle with ultrafine metal oxide particles deposited thereon in accordance with certain aspects of the present invention.

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances.

As used herein, the term "average particle size" refers to a particle size as determined by visually examining a micrograph of a transmission electron microscopy ("TEM") image, measuring the diameter of the particles in the image, and calculating the average particle size of the measured particles based on magnification of the TEM image. One of ordinary skill in the art will understand how to prepare such a TEM image and determine the average particle size based on the magnification. The size of a particle refers to the smallest diameter sphere that will completely enclose the individual particle.

As used herein, the term "B.E.T. specific surface area" refers to a specific surface area determined by nitrogen adsorption according to the ASTMD 3663-78 standard based on the Brunauer-Emmett-Teller method described in the periodical "The Journal of the American Chemical Society", 60, 309 (1938). As will be understood by those skilled in the art, a calculated equivalent spherical diameter can be determined from the B.E.T. specific surface area according to the following equation:

$$\text{Diameter(nanometers)} = 6000/[\text{BET}(m^2/g) * \rho(\text{grams}/cm^3)]$$

As used herein, the term "pigment" means a material that changes the color of light it reflects as a result of selective color absorption. Pigments have high tinting strengths relative to the materials they color. Pigments are stable in solid form at ambient temperatures and are insoluble in the vehicle in which they are suspended.

FIG. 1 schematically illustrates a pigment particle 10 in accordance with an embodiment of the present invention. The pigment particle 10 comprises a substrate particle 11 with several ultrafine metal oxide particles 12 deposited on the surface thereof. As more fully described below, during formation of the pigment particle in a plasma system, the relatively large substrate particle 11 forms first, followed by heterogeneous nucleation and deposition of the ultrafine metal oxide particles 12 on the surface of the previously formed substrate particle 11. Although the ultrafine metal oxide particles 12 may form a single layer on the substrate particle 11 in which adjacent ultrafine particles touch each other as shown in FIG. 1, the deposited ultrafine particles may not touch each other in some embodiments, e.g., when there is a lower ratio or concentration of the ultrafine oxide particles 12 in comparison with the substrate particles 11.

In certain embodiments, the substrate particles 11 have an average particle size of no more than 1,000 nanometers, in some cases, no more than 500 nanometers or, in yet other cases, no more than 300 or 400 nanometers. In certain embodiments, the substrate particles have an average particle size of no less than 20 nanometers, in some cases, no less than 50 nanometers. For example, the substrate particles may have an average particle size of from about 100 to about 300 nanometers.

The substrate particles may comprise oxides, mixed oxides and/or nitrides. In certain embodiments, the substrate particles comprise $SiO_2$, $Al_2O_3$, $Bi_2O_3$, $Al_2SiO_5$, BN, AlN, $Si_3N_4$ and the like. In a particular embodiment, the substrate particles comprise $SiO_2$.

In certain embodiments in which the pigment particles 10 are mixed into a coating composition, the substrate particles 11 have a refractive index which substantially matches a refractive index of a base material of the coating composition into which the pigment particles are mixed. In this embodiment, by substantially matching the refractive indices of the substrate particles 11 and the base material of the coating composition, the substrate particles 11 appear substantially colorless, and rely upon the deposited ultrafine metal oxide particles 12 to provide the desired color characteristics for the pigment particles 10. In certain embodiments, the refractive index of the substrate particles 11 may be from about 1.4 to about 1.6, in some cases, from about 1.48 to about 1.54.

The ultrafine metal oxide particles 12 typically have an average particle size of no more than 20 nanometers, such as no more than 10 nanometers. In certain embodiments, the ultrafine metal oxide particles have an average particle size of from 1 to 5 nanometers, in some cases, from 2 to 4 nanometers.

In certain embodiments, the ratio of the average particle size of the substrate particles 11 to the average particle size of the ultrafine metal oxide particles 12 is greater than 2:1, in some cases, greater than 5:1. For example, the average particle size ratio may be from about 10:1 to about 1,000:1, in some cases, from about 20:1 to about 500:1.

The metal of the ultrafine metal oxide particles 12 may comprise at least one metal selected from Cu, Al, Si, Ti, V, Mn, Fe, Co, Mo, Sn, Ce and the like.

In accordance with certain embodiments of the present invention, the ultrafine metal oxide particles 12 are partially oxidized. As used herein, the term "partially oxidized" means the metal oxide is not at its highest oxidation state. For example, copper oxide in its fully oxidized state has a formula CuO, while partially oxidized copper oxide has a lower atomic ratio of oxygen, i.e., from zero to less than 1. As a particular example, the partially oxidized copper oxide may comprise $Cu_2O$. As another example, while fully oxidized titanium oxide is of the formula $TiO_2$, partially oxidized titanium oxide may be of the formula $Ti_3O_4$. In certain embodiments, the partially oxidized ultrafine metal oxide particles may comprise AlO, SiO, $Ti_3O_4$, $V_2O_3$, VO, MnO, $Mn_2O_3$, $Fe_3O_4$, $CO_3O_4$, $Cu_2O$, MoO2, SnO and/or $Ce_2O_3$. Partial oxidation may result from the use of partially oxidized feed materials such as those described above. Furthermore, partial oxidation may result from the use of an inert atmosphere during the plasma-forming method in accordance with certain embodiments of the present invention. For example, a carrier gas may be introduced to the plasma that is substantially free of oxygen as more fully described below In certain embodiments, $Cu_2O$ partially oxidized ultrafine metal oxide particles are formed on substrate particles such as $SiO_2$. The use of such substrate particles allows the $Cu_2O$ to heterogeneously nucleate on the $SiO_2$ substrate particles which are formed first during the plasma treatment process. Without the prior formation of such substrate particles, the $Cu_2O$ does not form sufficiently small particles, i.e., less than 10 nanometers, but instead grows to much larger particle sizes.

Figure 2:
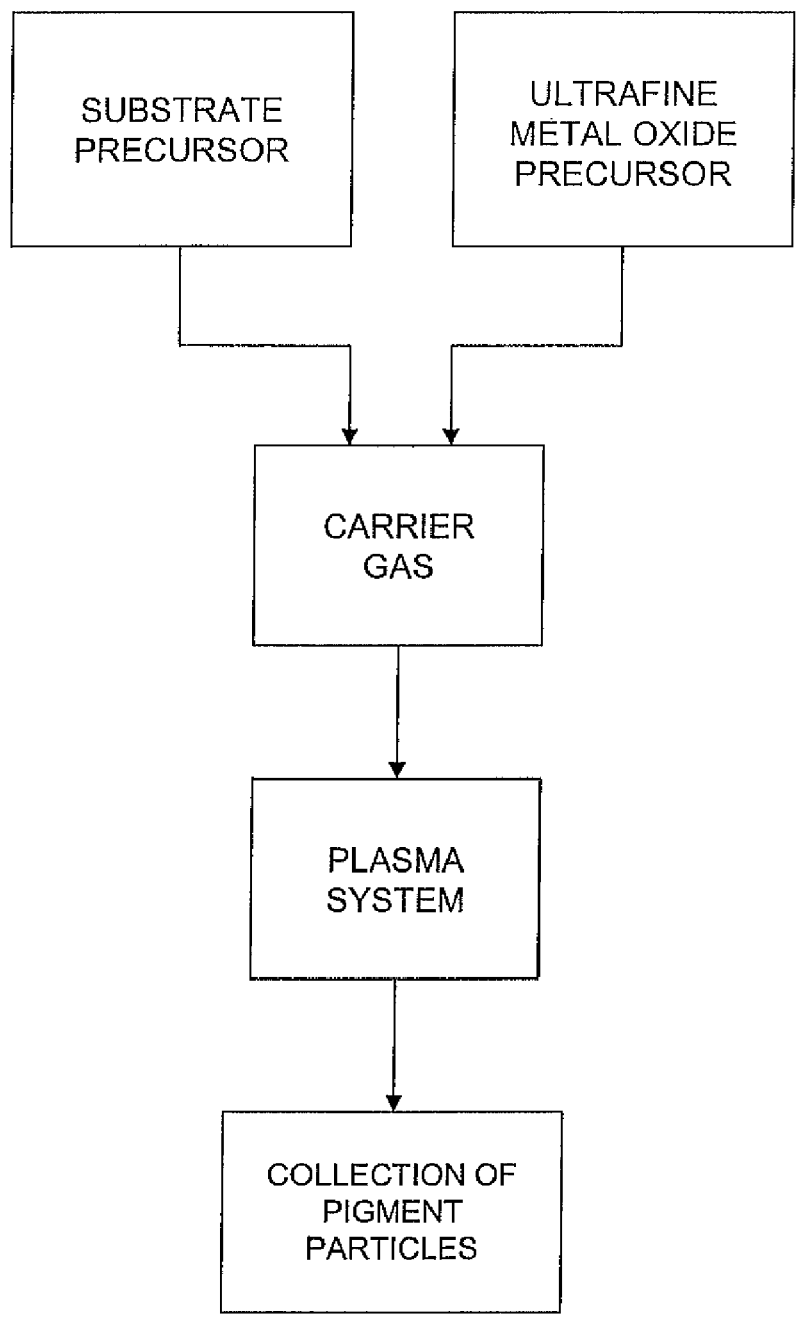
FIG. 2 is a flowchart depicting the steps of certain methods of the present invention.

FIG. 2 is a flow diagram depicting certain embodiments of the methods of the present invention. Substrate precursor material and a metal oxide precursor material are provided as feed materials. In the embodiment shown in FIG. 1, the precursors are provided from separate sources. However, a single source comprising a mixture of the precursors may be used.

In certain embodiments, the substrate precursor material is provided in solid particulate form. The particulates may be suspended in a suitable fluid such as a carrier gas or liquid. The particulate substrate precursor feed material typically has an average particle size of greater than 0.1 micron, in some cases, from about 0.3 to about 200 microns.

The ultrafine metal oxide precursor feed materials may be provided in particulate form. The particles may be suspended in a fluid such as a carrier gas or liquid. The particulate ultrafine metal oxide precursor feed material typically has an average particle size of greater than 0.5 micron, in some cases, from about 10 to about 200 microns.

In accordance with certain embodiments, the ultrafine metal oxide precursor material has reflectance characteristics different from the pigment particles which are produced by the plasma process. For example, the ultrafine metal oxide particles deposited on the surfaces of the substrate particles as a result of the plasma process may be of different color than the starting particulate ultrafine metal oxide precursor materials. For example, when $Cu_2O$ is used as an ultrafine metal oxide precursor feed material, it may be provided in a powder form having a red color. However, after plasma treatment, the ultrafine $Cu_2O$ particles deposited on the substrate particles may provide a pigment with a green color. In this case, the change from red to green represents a shift from longer to shorter reflectance wavelengths.

As shown in FIG. 2, in accordance with certain methods of the present invention, the precursors are contacted with a carrier. The carrier may be a gas that acts to suspend or atomize the precursors in the gas, thereby producing a gas-stream in which the precursors are entrained. In certain embodiments, the carrier gas is inert and is substantially free of oxygen in order to maintain partial oxidation of the ultrafine metal oxide particles that are formed during the plasma process. Suitable carrier gases include, but are not limited to, argon, helium, nitrogen, hydrogen, or a combination thereof.

Next, in accordance with certain embodiments of the present invention, the precursors are heated by a plasma system, e.g., as the entrained precursors flow into a plasma chamber, yielding a gaseous stream of the precursors and/or their vaporized or thermal decomposition products and/or their reaction products. In certain embodiments, the precursors are heated to a temperature ranging from 1,500° to 20,000° C., such as 1,700° to 8,000° C.

In certain embodiments, the gaseous stream may be contacted with other reactants or dopants may be injected into the plasma chamber or which may be introduced as part of the precursors. Suitable additional reactant materials include, but are not limited to, hydrogen, nitrogen, methane and/or silane.

In certain methods of the present invention, after the gaseous stream is produced, it is contacted with one or more quench streams that are injected into the plasma chamber through at least one quench stream injection port. For example, the quench streams are injected at flow rates and injection angles that result in impingement of the quench streams with each other within the gaseous stream. The material used in the quench streams is not limited, so long as it adequately cools the gaseous stream to facilitate the formation or control the particle size of the substrate particles and the ultrafine metal oxide particles deposited on the surfaces of the substrate particles, and also maintains the desired compositions of the particles. Materials suitable for use in the quench streams include, but are not limited to, inert gases such as argon, helium, nitrogen, carbon dioxide, hydrogen gas, ammonia, mono, di and polybasic alcohols, hydrocarbons, amines and/or carboxylic acids.

In certain embodiments, the particular flow rates and injection angles of the various quench streams may vary, so long as they impinge with each other within the gaseous stream to result in the rapid cooling of the gaseous stream. For example, the quench streams may primarily cool the gaseous stream through dilution, rather than adiabatic expansion, thereby causing a rapid quenching of the gaseous stream, before, during and/or after the formation of the particles prior to passing the particles into and through a converging member, such as a converging-diverging nozzle, as described below.

In certain embodiments of the invention, after contacting the gaseous product stream with the quench streams to cause production of the particles, the particles may be passed through a converging member, wherein the plasma system is designed to minimize the fouling thereof. In certain embodiments, the converging member comprises a converging-diverging (De Laval) nozzle. In these embodiments, while the converging-diverging nozzle may act to cool the product stream to some degree, the quench streams perform much of the cooling so that a substantial amount of the particles are formed upstream of the nozzle. In these embodiments, the converging-diverging nozzle may primarily act as a choke position that permits operation of the reactor at higher pressures, thereby increasing the residence time of the materials therein.

As is seen in FIG. 2, in certain embodiments of the methods of the present invention, after the pigment particles exit the plasma system, they are collected. Any suitable means may be used to separate the particles from the gas flow, such as, for example, a bag filter, cyclone separator or deposition on a substrate. The collected ultrafine particles are then mixed with a base coating composition comprising a binder or resin, liquid medium and additives conventionally used in coating compositions.

FIG. 3 is a partially schematic sectional diagram of an apparatus for producing pigment particles in accordance with certain embodiments of the present invention. A plasma chamber 20 is provided that includes a feed inlet 50 which, in the embodiment shown in FIG. 3, is used to introduce a mixture of substrate particle precursor and ultrafine metal oxide particle precursor into the plasma chamber 20. In another embodiment, the feed inlet 50 may be replaced with separate inlets (not shown) for the different precursors. Also provided is at least one carrier gas feed inlet 14, through which a carrier gas flows in the direction of arrow 30 into the plasma chamber 20. The carrier gas may act to suspend or atomize the precursors in the gas, thereby producing a gas-stream with the entrained precursors which flows towards plasma 29. Numerals 23 and 25 designate cooling inlet and outlet respectively, which may be present for a double-walled plasma chamber 20. In these embodiments, coolant flow is indicated by arrows 32 and 34.

In the embodiment depicted by FIG. 3, a plasma torch 21 is provided. The torch 21 may thermally decompose or vaporize the precursors within or near the plasma 29 as the stream is delivered through the inlet of the plasma chamber 20, thereby producing a gaseous stream. As is seen in FIG. 2, the precursors are, in certain embodiments, injected downstream of the location where the arc attaches to the annular anode 13 of the plasma generator or torch.

A plasma is a high temperature luminous gas which is at least partially (1 to 100%) ionized. A plasma is made up of gas atoms, gas ions, and electrons. A thermal plasma can be created by passing a gas through an electric arc. The electric arc will rapidly heat the gas by resistive and radiative heating to very high temperatures within microseconds of passing through the arc. The plasma is often luminous at temperatures above 9,000 K.

A plasma can be produced with any of a variety of gases. This can give excellent control over any chemical reactions taking place in the plasma as the gas may be inert, such as argon, helium, or neon, reductive, such as hydrogen, methane, ammonia, and carbon monoxide, or oxidative, such as oxygen, nitrogen, and carbon dioxide. Inert or reductive gas mixtures may be used to produce pigment particles in accordance with the present invention. In FIG. 3, the plasma gas feed inlet is depicted at 31.

As the gaseous product stream exits the plasma 29 it proceeds towards the outlet of the plasma chamber 20. An additional reactant, as described earlier, can optionally be injected into the reaction chamber prior to the injection of the quench streams. A supply inlet for the additional reactant is shown in FIG. 3 at 33.

As is seen in FIG. 3, in certain embodiments of the present invention, the gaseous stream is contacted with a plurality of quench streams which enter the plasma chamber 20 in the direction of arrows 41 through a plurality of quench stream injection ports 40 located along the circumference of the plasma chamber 20. As previously indicated, the particular flow rate and injection angle of the quench streams is not limited so long as they result in impingement of the quench streams 41 with each other within the gaseous stream, in some cases at or near the center of the gaseous stream, to result in the rapid cooling of the gaseous stream to control the particle size of the substrate particles and the ultrafine metal particles deposited thereon. This may result in a quenching of the gaseous stream through dilution.

In certain methods of the present invention, contacting the gaseous stream with the quench streams may result in the formation and/or control of the particle size of the particles, which are then passed into and through a converging member. As used herein, the term "converging member" refers to a device that restricts passage of a flow therethrough, thereby controlling the residence time of the flow in the plasma chamber due to pressure differential upstream and downstream of the converging member.

Figure 3:
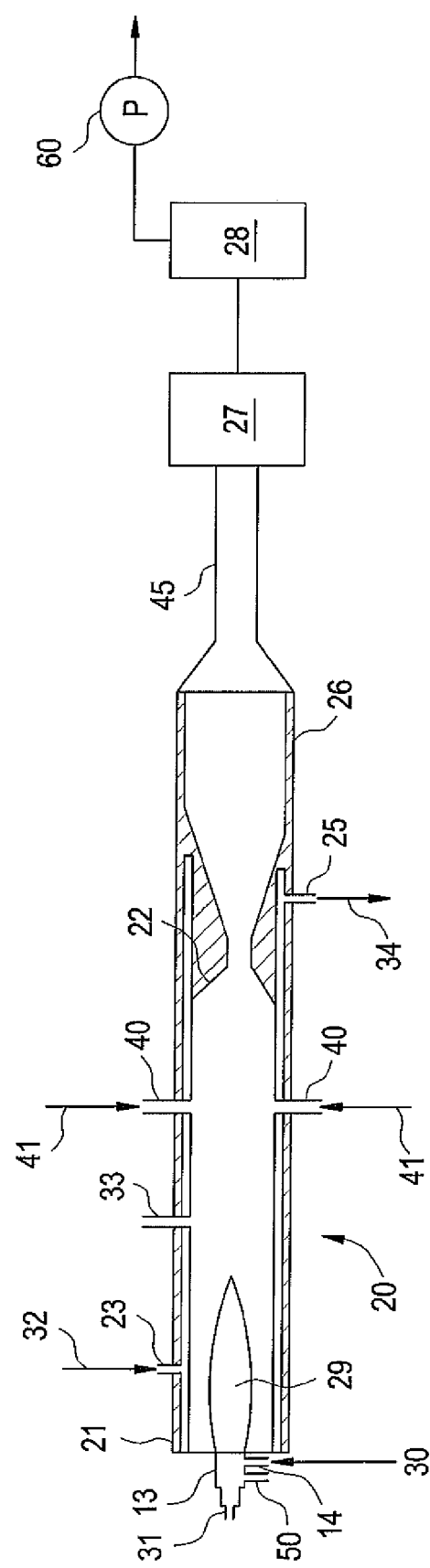
FIG. 3 is a partially schematic sectional view of an apparatus for producing pigment particles comprising ultrafine metal oxide particles deposited on substrate particles including a precursor feed line and plasma chamber in accordance with certain embodiments of the present invention.

In certain embodiments, the converging member comprises a converging-diverging (De Laval) nozzle, such as that depicted in FIG. 3, which is positioned within the outlet of the plasma chamber 20. The converging or upstream section of the nozzle, i.e., the converging member, restricts gas passage and controls the residence time of the materials within the plasma chamber 20. It is believed that the contraction that occurs in the cross sectional size of the stream as it passes through the converging portion of nozzle 22 changes the motion of at least some of the flow from random directions, including rotational and vibrational motions, to a straight line motion parallel to the plasma chamber axis. In certain embodiments, the dimensions of the plasma chamber 20 and the material flow are selected to achieve sonic velocity within the restricted nozzle throat.

As the confined stream of flow enters the diverging or downstream portion of the nozzle 22, it is subjected to an ultra fast decrease in pressure as a result of a gradual increase in volume along the conical walls of the nozzle exit. By proper selection of nozzle dimensions, the plasma chamber 20 can be operated at atmospheric pressure, or slightly less than atmospheric pressure, or, in some cases, at a pressurized condition, to achieve the desired residence time, while the chamber 26 downstream of the nozzle 22 is maintained at a vacuum pressure by operation of a vacuum producing device, such as a vacuum pump 60. Following passage through nozzle 22, the pigment particles may then enter a cool down chamber 26.

Although the nozzle shown in FIG. 2 includes a converging portion and a downstream diverging portion, other nozzle configurations may be used. For example, the downstream diverging portion may be replaced with a straight portion. Quench streams may be introduced at or near the transition from the converging portion to the straight portion.

As is apparent from FIG. 3, in certain embodiments of the present invention, the pigment particles may flow from cool down chamber 26 to a collection station 27 via a cooling section 45, which may comprise, for example, a jacketed cooling tube. In certain embodiments, the collection station 27 comprises a bag filter or other collection means. A downstream scrubber 28 may be used if desired to condense and collect material within the flow prior to the flow entering vacuum pump 60.

Figure 4:
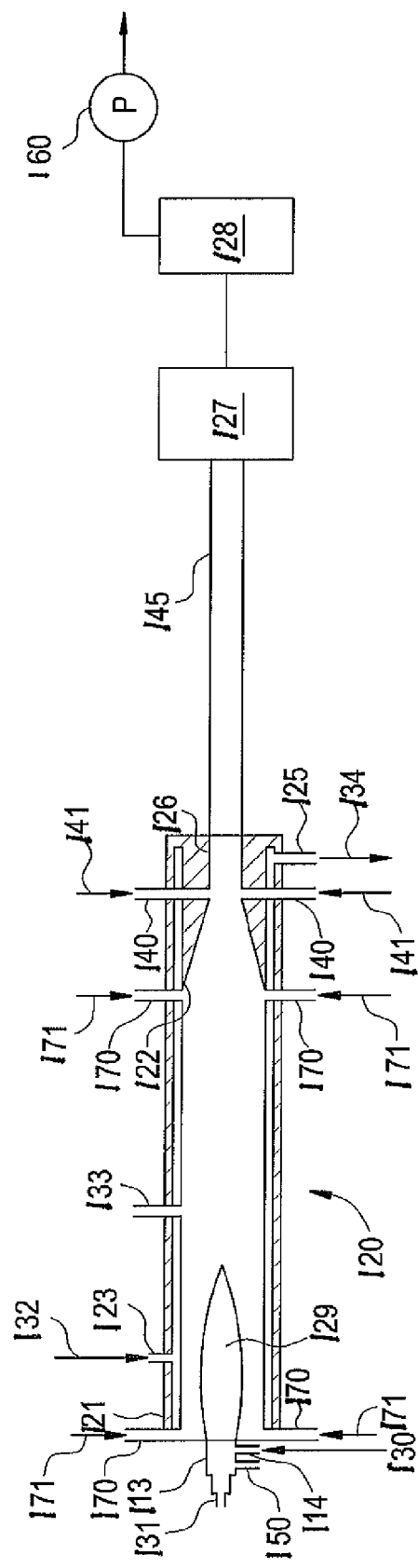
FIG. 4 is a partially schematic sectional view of an apparatus for producing pigment particles comprising ultrafine metal oxide particles deposited on substrate particles including a precursor feed line and plasma chamber in accordance with certain embodiments of the present invention.

FIG. 4 is a partially schematic diagram of an apparatus for producing pigment particles in accordance with certain embodiments of the present invention. A plasma chamber 120 is provided that includes a precursor feed inlet 150. Also provided is at least one carrier gas feed inlet 114, through which a carrier gas flows in the direction of arrow 130 into the plasma chamber 120. As previously indicated, the carrier gas acts to suspend the precursor in the gas, thereby producing a gas-stream suspension of the precursor which flows towards plasma 129. Numerals 123 and 125 designate cooling inlet and outlet respectively, which may be present for a double-walled plasma chamber 120. In these embodiments, coolant flow is indicated by arrows 132 and 134.

In the embodiment depicted by FIG. 4, a plasma torch 121 is provided. Torch 121 thermally decomposes the incoming gas-stream suspension of precursors within the resulting plasma 129 as the stream is delivered through the inlet of the plasma chamber 120, thereby producing a gaseous product stream. As is seen in FIG. 4, the precursors are, in certain embodiments, injected downstream of the location where the arc attaches to the annular anode 113 of the plasma generator or torch.

In FIG. 4, the plasma gas feed inlet is depicted at 131. As the gaseous product stream exits the plasma 129 it proceeds towards the outlet of the plasma chamber 120. As is apparent, a reactant, as described earlier, can be injected into the reaction chamber prior to the injection of the quench streams. A supply inlet for the reactant is shown in FIG. 4 at 133.

As is seen in FIG. 4, in certain embodiments of the present invention, the gaseous product stream is contacted with a plurality of quench streams which enter the plasma chamber 120 in the direction of arrows 141 through a plurality of quench stream injection ports 140 located along the circumference of the plasma chamber 120. As previously indicated, the particular flow rate and injection angle of the quench streams is not limited so long as they result in impingement of the quench streams 141 with each other within the gaseous product stream, in some cases at or near the center of the gaseous product stream, to result in the rapid cooling of the gaseous product stream to produce ultrafine metal oxide particles on the substrate particles. This results in a quenching of the gaseous product stream through dilution to form ultrafine particles.

In certain embodiments of the present invention, such as is depicted in FIG. 4, one or more sheath streams are injected into the plasma chamber upstream of the converging member. As used herein, the term "sheath stream" refers to a stream of gas that is injected prior to the converging member and which is injected at flow rate(s) and injection angle(s) that result in a barrier separating the gaseous product stream from the plasma chamber walls, including the converging portion of the converging member. The material used in the sheath stream(s) is not limited, so long as the stream(s) act as a barrier between the gaseous product stream and the converging portion of the converging member, as illustrated by the prevention, to at least a significant degree, of material sticking to the interior surface of the plasma chamber walls, including the converging member. For example, materials suitable for use in the sheath stream(s) include, but are not limited to, those materials described earlier with respect to the quench streams. A supply inlet for the sheath stream is shown in FIG. 4 at 170 and the direction of flow is indicated by numeral 171.

By proper selection of the converging member dimensions, the plasma chamber 120 can be operated at atmospheric pressure, or slightly less than atmospheric pressure, or, in some cases, at a pressurized condition, to achieve the desired residence time, while the chamber 126 downstream of the converging member 122 is maintained at a vacuum pressure by operation of a vacuum producing device, such as a vacuum pump 160. Following production of the pigment particles, they may then enter a cool down chamber 26.

As is apparent from FIG. 4, in certain embodiments of the present invention, the pigment particles may flow from cool down chamber 126 to a collection station 127 via a cooling section 145, which may comprise, for example, a jacketed cooling tube. In certain embodiments, the collection station 127 comprises a bag filter or other collection means. A downstream scrubber 128 may be used if desired to condense and collect material within the flow prior to the flow entering vacuum pump 160.

The precursors may be injected under pressure (such as from 1 to 100 psi) through a small orifice to achieve sufficient velocity to penetrate and mix with the plasma. In addition, in many cases the injected precursor stream is injected normal (90° angle) to the flow of the plasma gases. In some cases, positive or negative deviations from the 90° angle by as much as 30° may be desired.

The high temperature of the plasma may rapidly decompose and/or vaporize the precursors. There can be a substantial difference in temperature gradients and gaseous flow patterns along the length of the plasma chamber 20. It is believed that, at the plasma arc inlet, flow is turbulent and there is a high temperature gradient from temperatures of about 20,000 K at the axis of the chamber to about 375 K at the chamber walls. At the nozzle throat, it is believed, the flow is laminar and there is a very low temperature gradient across its restricted open area.

The plasma chamber is often constructed of water cooled stainless steel, nickel, titanium, copper, aluminum, or other suitable materials. The plasma chamber can also be constructed of ceramic materials to withstand a vigorous chemical and thermal environment.

The plasma chamber walls may be internally heated by a combination of radiation, convection and conduction. In certain embodiments, cooling of the plasma chamber walls prevents unwanted melting and/or corrosion at their surfaces. The system used to control such cooling should maintain the walls at as high a temperature as can be permitted by the selected wall material, which often is inert to the materials within the plasma chamber at the expected wall temperatures. This is true also with regard to the nozzle walls, which may be subjected to heat by convection and conduction.

The length of the plasma chamber is often determined experimentally by first using an elongated tube within which the user can locate the target threshold temperature. The plasma chamber can then be designed long enough so that the materials have sufficient residence time at the high temperature to reach an equilibrium state and complete the formation of the desired end products.

The inside diameter of the plasma chamber may be determined by the fluid properties of the plasma and moving gaseous stream. It should be sufficiently great to permit necessary gaseous flow, but not so large that recirculating eddies or stagnant zones are formed along the walls of the chamber. Such detrimental flow patterns can cool the gases prematurely and precipitate unwanted products. In many cases, the inside diameter of the plasma chamber is more than 100% of the plasma diameter at the inlet end of the plasma chamber.

In certain embodiments, the converging section of the nozzle has a high aspect ratio change in diameter that maintains smooth transitions to a first steep angle (such as >45°) and then to lesser angles (such as <45°) leading into the nozzle throat. The purpose of the nozzle throat is often to compress the gases and achieve sonic velocities in the flow. The velocities achieved in the nozzle throat and in the downstream diverging section of the nozzle are controlled by the pressure differential between the plasma chamber and the section downstream of the diverging section of the nozzle. Negative pressure can be applied downstream or positive pressure applied upstream for this purpose. A converging-diverging nozzle of the type suitable for use in the present invention is described in U.S. Pat. No. RE 37,853 at col. 9, line 65 to col. 11, line 32, the cited portion of which being incorporated by reference herein.

In certain embodiments, the present pigments are used in coatings. Such coatings may comprise a base material such as a binder, liquid medium and additives. Some examples of water-based coatings include mixtures of titania, latex, water, biocide and fumed silica. Some examples of oil-based coatings include alumina, titania, epoxy, alcohol and fumed silica. Other types of coatings include mixtures of clay, polyurethane, water and fumed silica. The pigments of the present invention may be added to coating compositions in amounts from about 0.1 to about 20 weight percent of the total coating composition. Conventional mixing techniques may be used to mix the ultrafine pigment particles with the base material of the coating composition.

The following examples are intended to illustrate certain embodiments of the present invention, and are not intended to limit the scope of the invention.

Example 1

Particles were prepared using a DC thermal plasma system. The plasma system included a DC plasma torch (Model SG-100 Plasma Spray Gun commercially available from Praxair Technology, Inc., Danbury, Conn.) operated with 60 standard liters per minute of argon carrier gas and 16 kilowatts of power delivered to the torch. A solid precursor feed composition comprising the materials and amounts listed in Table 1 was prepared and fed to the reactor at a rate of about 1 grams per minute through a gas assistant powder feeder (Model 1264 commercially available from Praxair Technology) located at the plasma torch outlet. At the powder feeder, 2.5 standard liters per minute argon was delivered as a carrier gas. Argon was delivered at 5 standard liters per minute through two ⅛ inch diameter nozzles located 180° apart at 0.69 inch downstream of the powder injection port. Following a 9.7 inch long reactor section, a plurality of quench stream injection ports were provided that included 6⅛ inch diameter nozzles located 60° apart radially. A 7 millimeter diameter converging-diverging nozzle of the type described in U.S. Pat. No. RE 37,853E was located 3 inches downstream of the quench stream injection ports. Argon quench gas was injected through the plurality of at the quench stream injection ports at a rate of 145 standard liters per minute.

TABLE 1

| Material | Amount |
| --- | --- |
| Cu[1] | 10 grams |
| Silica[2] | 90 grams |

[1]Commercially available from Alfa Aesar Co., Ward Hill, MA.
[2]Commercially available under the tradename WB-10 from PPG Industries, Inc., Pittsburgh, PA.

The produced particles had a theoretical composition of 10 weight percent copper and 90 weight percent silica. The measured B.E.T. specific surface area was 346 square meters per gram using the Gemini model 2360 analyzer and the calculated equivalent spherical diameter was 6 nanometers for the combination of copper and silica.

Example 2

Particles from solid precursors were prepared using the apparatus and conditions identified in Example 1, except the feed materials and amounts are listed in Table 2.

TABLE 2

| Material | Amount |
| --- | --- |
| $Cu_2O$[3] | 11.3 grams |
| Silica[2] | 88.7 grams |

[3]Commercially available from Sigma Aldrich Co., St Louis, Missouri.

The produced particles had a theoretical composition of 11.3 weight percent cupric oxide and 88.7 weight percent silica. The measured B.E.T. specific surface area was 202 square meters per gram using the Gemini model 2360 analyzer and the calculated equivalent spherical diameter was 11 nanometers for the combination of cupric oxide and silica.

In order to obtain UV-vis spectra, pot mill dispersions of particles samples (10% Cu/90% silica and 11.3% $Cu_2O$/88.7% silica) were prepared. A dispersant (Solsperse 32500) and n-butyl acetate solvent were used in the milling. After milling, hazy material was removed using a centrifugal separation technique.

Figure 5:
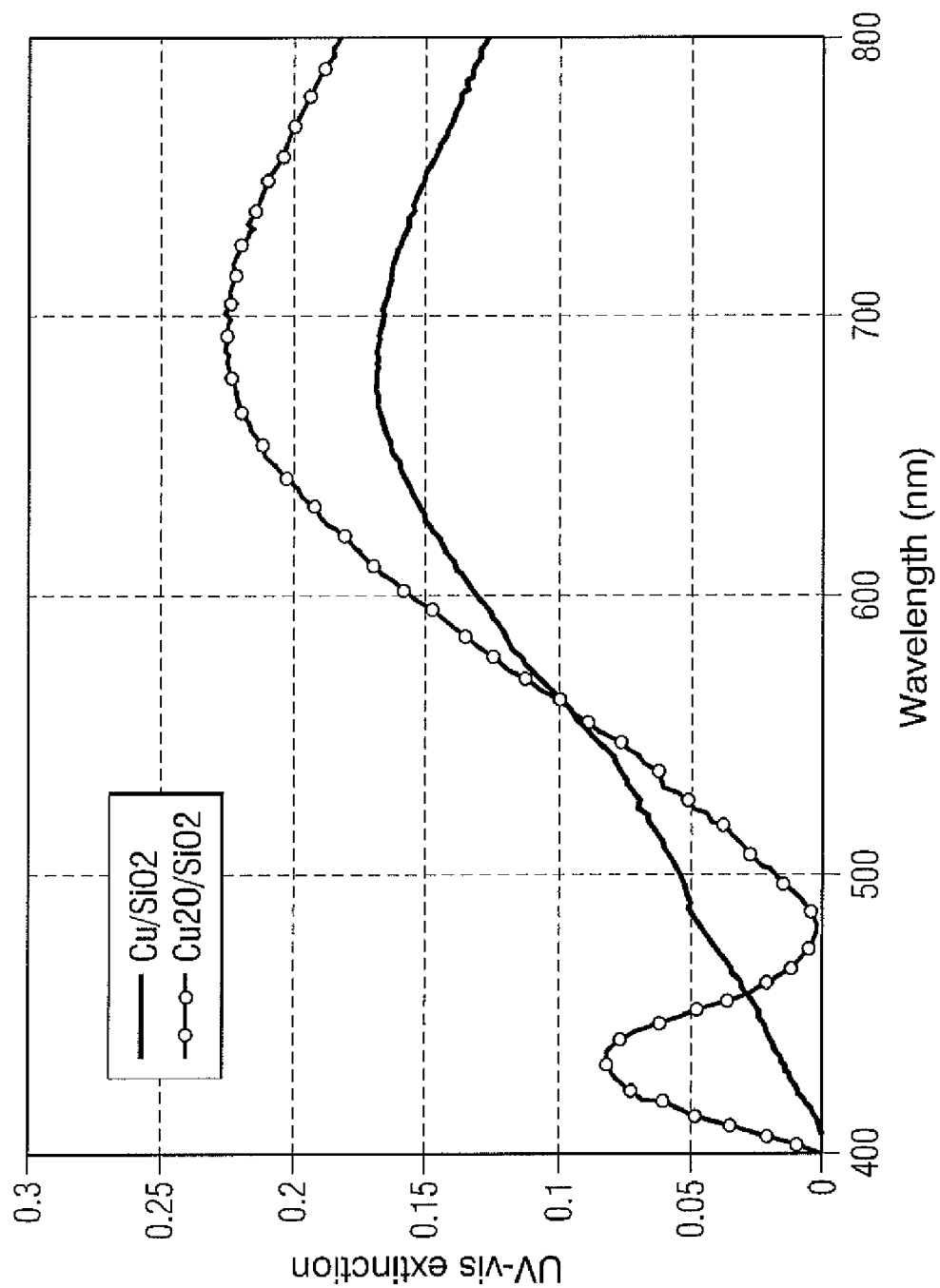
FIG. 5 is a graph of reflected light intensity versus wavelength for two pigment samples of the present invention.

In order to see the peaks from the absorption/scattering measurements, the spectra were normalized to their extinction values at 400 nm and subtracted from the normalized Solsperse spectrum from the other two spectra. This gives the "corrected" spectra as shown in FIG. 5, which is a graph of reflected light intensity versus wavelength for pigment particles made in accordance with the previous examples. The $SiO_2$/Cu particles of Example 1 have a reflectance peak in the green region of the spectrum, while the $SiO_2$/$Cu_2O$ particles of Example 2 exhibit reflectance in the red region of the spectrum.

Whereas particular embodiments of this invention have been described above for purposes of illustration, it will be evident to those skilled in the art that numerous variations of the details of the present invention may be made without departing from the invention as defined in the appended claims.

We claim:

1. A coating composition comprising:
a base coating material; and
a pigment dispersed in the base coating material, wherein the pigment comprises substrate particles and discrete ultrafine metal oxide particles deposited on the substrate particles, wherein the ultrafine metal oxide particles are partially oxidized and comprise AlO, SiO, $Ti_3O_4$, $V_2O_3$, VO, and/or $Co_3O_4$.

2. The coating composition of claim 1, wherein the pigment comprises from about 0.1 to about 20 weight percent of the coating composition.

3. The coating composition of claim 1, wherein the substrate particles have a refractive index which substantially matches a refractive index of the base coating material.

4. The coating composition of claim 3, wherein the refractive index of the substrate particles is from about 1.4 to about 1.6.

5. The coating composition of claim 1, wherein the substrate particles comprise an oxide, mixed oxide and/or nitride.

6. The coating composition of claim 1, wherein the substrate particles comprise $SiO_2$, $Al_2O_3$, $Bi_2O_3$, $Al_2SiO_5$, BN, AlN and/or $Si_3N_4$.

7. The coating composition of claim 1, wherein the substrate particles comprise $SiO_2$.

8. The coating composition of claim 1, wherein the substrate particles have an average size of less than 1,000 nm.

9. The coating composition of claim 1, wherein the substrate particles have an average size of from about 20 to about 500 nm.

10. The coating composition of claim 1, wherein the substrate particles have an average size of from about 50 nm to about 400 nm.

11. The coating composition of claim 1, wherein the ultrafine metal oxide particles comprises $Ti_3O_4$.

12. The coating composition of claim 1, wherein the ultrafine metal oxide particles have an average size of less than about 10 nm.

13. The coating composition of claim 1, wherein the ultrafine metal oxide particles have an average size of from about 1 to about 5 nm.

14. The coating composition of claim 1, wherein the base coating material comprises latex, acrylics, epoxies and/or polyurethanes.

15. The coating composition of claim 14, wherein the substrate particles comprise $SiO_2$.

16. A pigment comprising:
substrate particles; and
discrete ultrafine partially oxidized metal oxide particles deposited on the substrate particles, wherein the ultrafine metal oxide particles comprise AlO, $V_2O_3$, VO, and/or $Co_3O_4$.

17. A coating composition comprising:
a base coating material; and
a pigment dispersed in the base coating material, wherein the pigment comprises substrate particles and ultrafine metal oxide particles deposited on the substrate particles, and the ultrafine metal oxide particles comprise partially oxidized titanium oxide.

18. The coating composition of claim 17, wherein the partially oxidized titanium oxide comprises $Ti_3O_4$.

19. A pigment comprising:
substrate particles; and
ultrafine partially oxidized metal oxide particles deposited on the substrate particles, wherein the ultrafine metal oxide particles comprise partially oxidized titanium oxide.

20. The pigment of claim 19, wherein the partially oxidized titanium oxide comprises $Ti_3O_4$.

21. A pigment comprising:
substrate particles; and
discrete ultrafine partially oxidized metal oxide particles deposited on the substrate particles, wherein the discrete ultrafine partially oxidized metal oxide particles form a layer on the substrate particle in which all adjacent ultrafine particles touch each other.

22. The pigment of claim 21, wherein the partially oxidized metal oxide comprises AlO, SiC, $Ti_3O_4$, $V_2O_3$, VO, MnO, $Mn_2O_3$, $Fe_3O_4$, $Co_3O_4$, $Cu_2O$, $MoO_2$, SnO and/or $Ce_2O_3$.

23. A coating composition comprising the pigment of claim 21 and a binder.

* * * * *